United States Patent [19]
Hotary et al.

[11] Patent Number: 5,433,509
[45] Date of Patent: Jul. 18, 1995

[54] ADJUSTABLE ARMREST

[75] Inventors: James T. Hotary, Saugatuck; Sheldon J. Watjer, Holland; Philip C. George, Holland; Jay M. Frankhouse, Holland, all of Mich.

[73] Assignee: Prince Corporation, Holland, Mich.

[21] Appl. No.: 110,880

[22] Filed: Aug. 24, 1993

[51] Int. Cl.6 .................................................. A47C 7/54
[52] U.S. Cl. ..................... 297/411.33; 297/411.37; 297/411.38
[58] Field of Search ............ 297/113, 116, 117, 411.3, 297/411.31, 411.32, 411.33, 411.34, 411.37, 411.38

[56] References Cited
U.S. PATENT DOCUMENTS

| | | | |
|---|---|---|---|
| 1,706,634 | 3/1929 | Seils | 297/411.31 X |
| 3,292,972 | 12/1966 | Krueger | 297/411.34 X |
| 3,614,085 | 10/1971 | Cunningham | 297/411.37 X |
| 4,085,967 | 4/1978 | Spencer | 297/411.37 X |
| 4,598,948 | 7/1986 | Flowerday | 297/411 |
| 4,881,424 | 11/1989 | Clark et al. | 74/523 |
| 4,882,807 | 11/1989 | Frye et al. | 16/225 |
| 4,890,883 | 1/1990 | Boerema et al. | 297/227 |
| 4,953,259 | 9/1990 | Frye et al. | 16/225 |
| 5,076,641 | 12/1991 | Lindberg | 297/194 |
| 5,143,422 | 9/1992 | Althofer et al. | 297/411.38 X |

OTHER PUBLICATIONS

Armrest, Nov. 12, 1992, Serial No. 975,471.

Primary Examiner—Laurie K. Cranmer
Attorney, Agent, or Firm—Price, Heneveld, Cooper, DeWitt & Litton

[57] ABSTRACT

An armrest includes an armrest body and mounting mechanism to allow the armrest body to be pulled upwardly from a lower forward edge from a stored vertical position into a generally horizontal use position and subsequently be swiveled on a generally vertical axis in a generally horizontal plane from side to side to fully support and align with the longitudinal axis of the forearm of the In one embodiment of the invention, the upper surface of the armrest body was concave to cradle the user's arm. In yet another embodiment of the present invention, the armrest body was adjustable in a generally vertical plane for tilting the armrest to the most comfortable position.

20 Claims, 5 Drawing Sheets

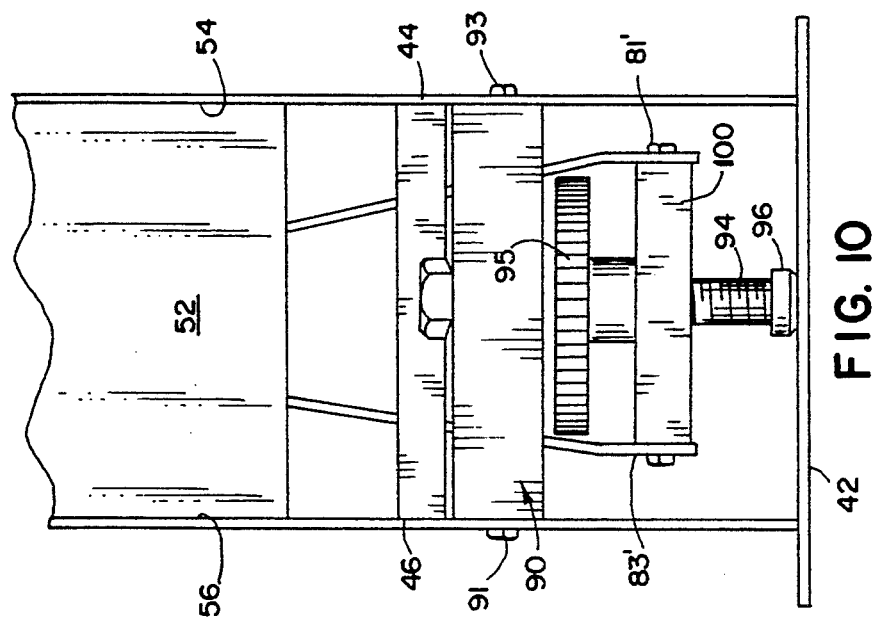
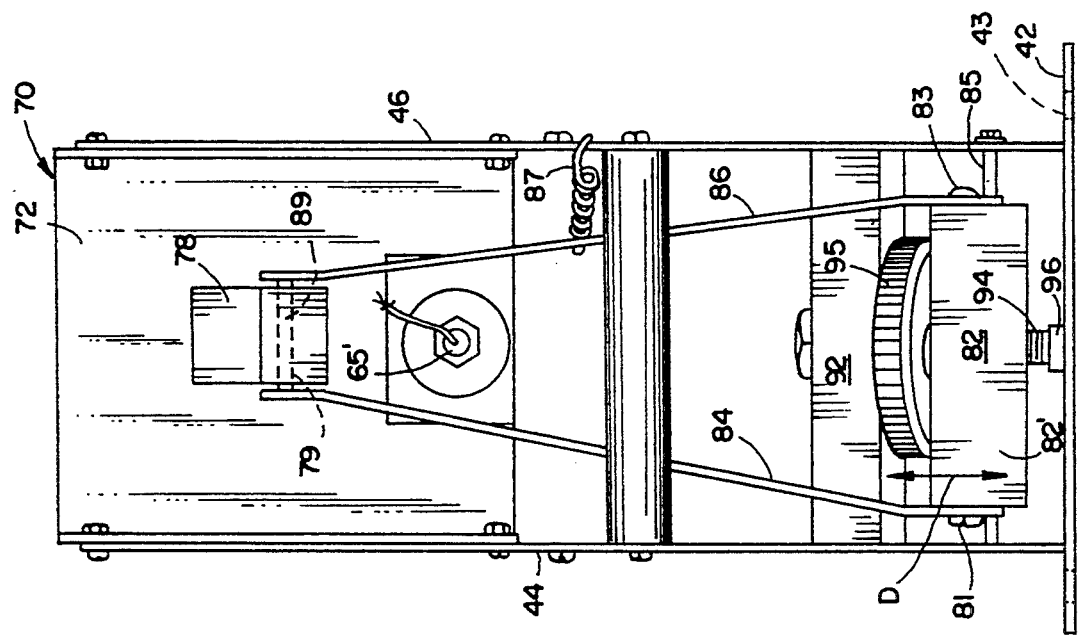

ADJUSTABLE ARMREST

BACKGROUND OF THE INVENTION

The present invention relates to an armrest for a vehicle and particularly one with a variety of adjustable use positions.

Vehicle armrests typically can be moved from a stored position in which they are generally vertically stored between the seats or within a recess of a bench seat of a vehicle downwardly to a lowered, horizontal use position when it is desired to use the armrest. Representative of such structure are U.S. Pat. Nos. 4,598,948; 4,881,424; 4,882,807; 4,890,883; 4,953,259; and 5,076,641. Some armrests also include a variety of accessories such as container holders as represented by, for example, U.S. Pat. No. 4,792,184. Such armrests pivot downwardly from a stored position and are, therefore, somewhat difficult to lower by the driver particularly when the vehicle is in operation. One suggested armrest pivots upwardly as represented by, for example, U.S. Pat. No. 3,168,346. Limited adjustability for an armrest has also been proposed in U.S. Pat. No. 2,902,085.

SUMMARY OF THE INVENTION

Such armrests have been widely used, however, they have not provided the degree of flexibility or comfort desired for modern day vehicles and particularly higher end luxury vehicles where the occupants may desire a greater degree of comfort. The armrest system of the present invention provides a pull-up armrest which is relatively easily extended from a stored position, even when the vehicle is in use, and which can be subsequently adjusted to a comfortable use position. For such purpose, the armrest mounting mechanism includes structure for mounting the armrest to pull upwardly from a lower forward edge into a generally horizontal use position and subsequently be swiveled on a generally vertical axis in a generally horizontal plane from side to side to fully support and align with the longitudinal axis of the forearm of the user regardless of the user's arm position. In addition in one embodiment of the invention, the upper surface of the armrest was concave to cradle the user's arm. In yet another embodiment of the present invention, the armrest was adjustable in a generally vertical plane for tilting the armrest to the most comfortable position.

Thus, an armrest embodying the present invention provides a greater degree of flexibility and comfort for use as well as easy movement between stored and use positions. These and other features objects, and advantages of the present invention will become apparent upon reading the following description thereof, together with reference to the accompanying drawings in which:

BRIEF DESCRIPTION OF THE DRAWINGS

FIG. 9 is a rear perspective view of the armrest show,, in FIG. 7 with the armrest in an extended position;

FIG. 10 is an enlarged fragmentary front elevational view of the tilt adjustment mechanism seen also in FIGS. 7 and 9.

DETAILED DESCRIPTION OF THE PREFERRED EMBODIMENT

Figure 1:
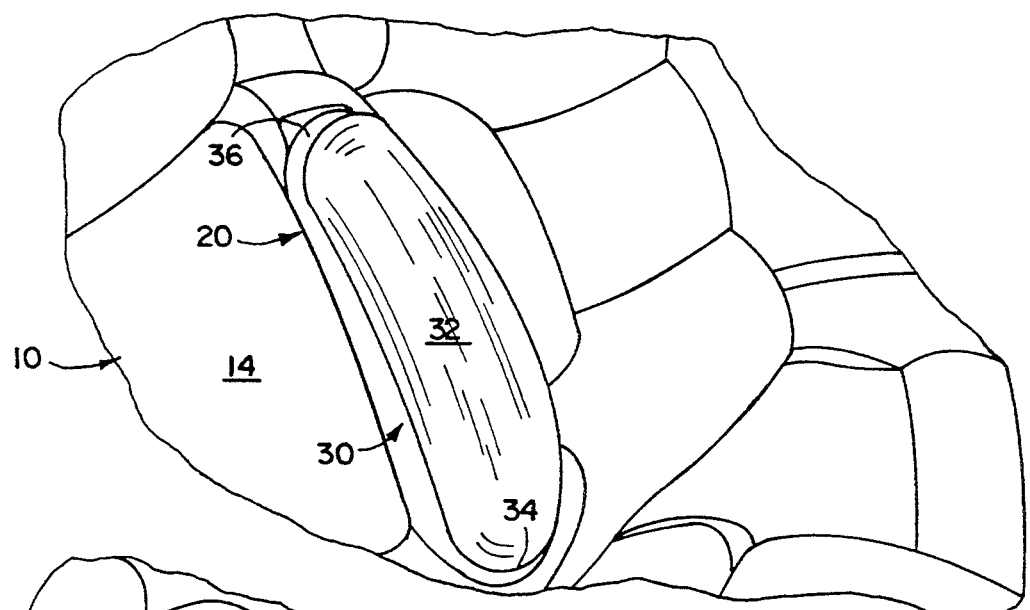
FIG. 1 is a fragmentary perspective view of a vehicle interior with an armrest embodying the present invention and shown in a stored position.
Figure 2:
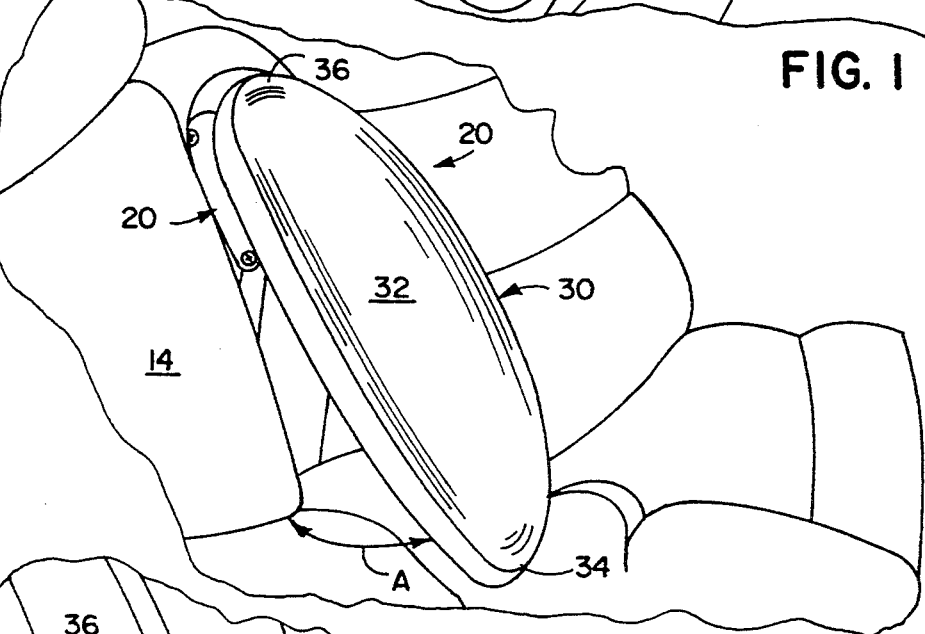
FIG. 2 is a fragmentary perspective view of the armrest shown in FIG. 1 shown partially moved from the stored position toward a use position.
Figure 3:
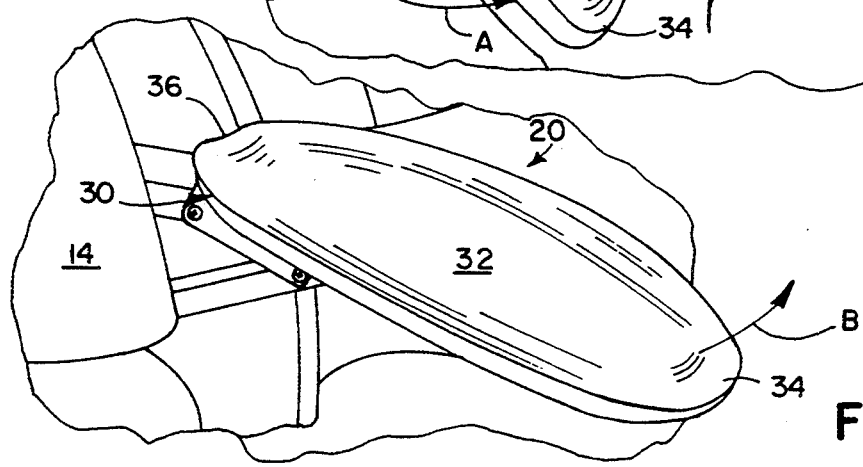
FIG. 3 is a fragmentary perspective view of the armrest shown in FIGS. 1 and 2 shown progressively moved from the stored position toward a first use position.
Figure 4:
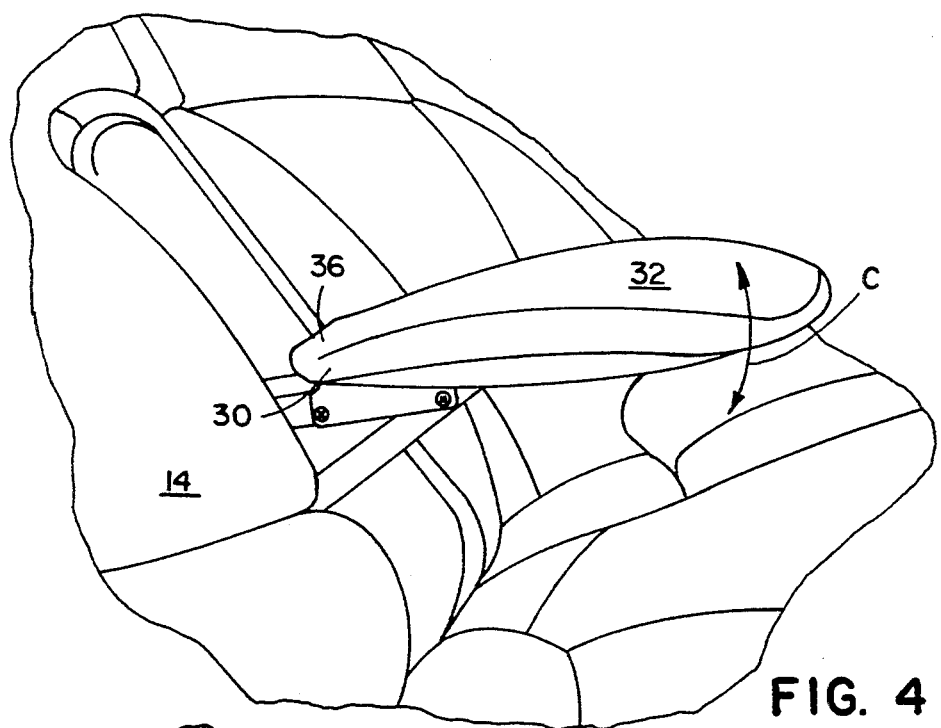
FIG. 4 is a fragmentary perspective view of the armrest shown in FIGS. 1-3 shown in a horizontal use position.

Referring initially to FIGS. 1-5, there is shown a vehicle 10 such as an automobile having split front seats with a driver's side seat 12 and a passenger side seat 14 between which there is mounted an armrest assembly 20 of the present invention. The armrest assembly includes an armrest body 30 with an upper concave surface 32. Body 30 is elongated and has rounded forward and rearward edges 34 and 36 respectively. The armrest body is supported by a control mechanism described below to move from a lowered, stored position as shown in FIG. 1 progressively upwardly from the forward edge 34 in a direction indicated by arrow A in FIGS. 2 and 3 to a generally horizontal first use position as shown in FIG. 4 in which the concave surface 32 is substantially horizontally positioned within the vehicle. The armrest can also be swiveled from side to side in a generally horizontal plane as indicated by arrow B in FIG. 5 along a generally vertical axis toward the rear 36 of the armrest as described below for purposes of aligning the longitudinal axis of the elongated armrest body 30 with the longitudinal axis of the forearm which it is supporting. Further, the armrest control mechanism allows for the tilting of the armrest in a vertical direction indicated by arrow C in FIG. 4 to assure that the angle of inclination of the otherwise generally horizontally extending armrest body 30 comfortably aligns with the angle of inclination of the user's forearm.

The armrest is raised from the stored position shown in FIG. 1 by grasping the forward lower end 34 as seen in FIG. 1 and raising the armrest manually upwardly in a direction indicated by arrow A whereupon, when it reaches the horizontal use position as shown in FIG. 4, the armrest is latched in the use position by latching the mechanism associated with the control mechanism described below. In this position it is available for subsequent tilting or swiveling or both as desired, to position the armrest supporting surface 32 in the most comfortable position. Having the described the overall, general structure of the armrest, a more detailed description follows in connection with FIGS. 6-11.

Figure 8:
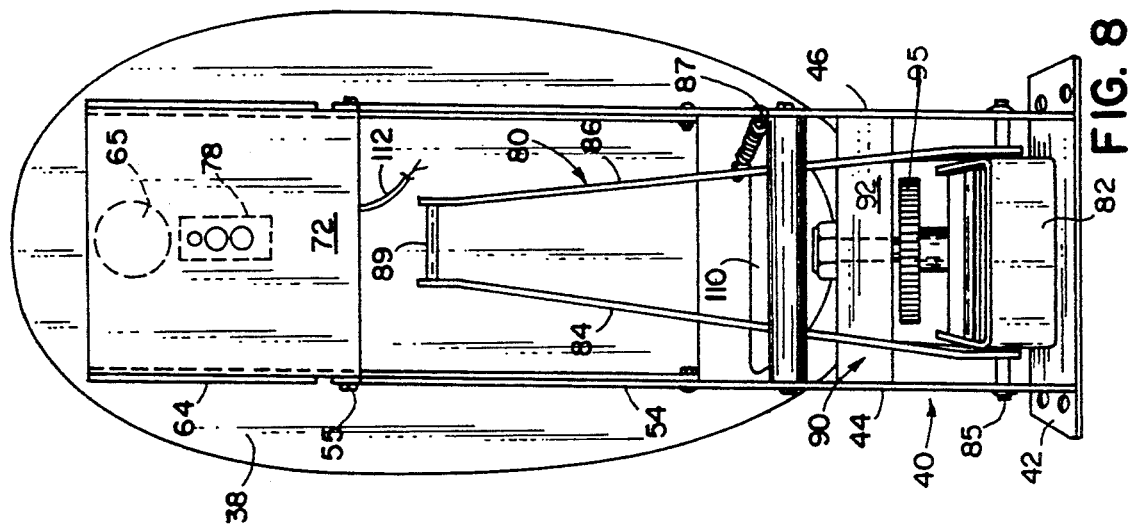
FIG. 8 is a fragmentary rear elevational view of the armrest shown in FIG. 6 with the armrest shown in a collapsed, stored position.
Figure 6:
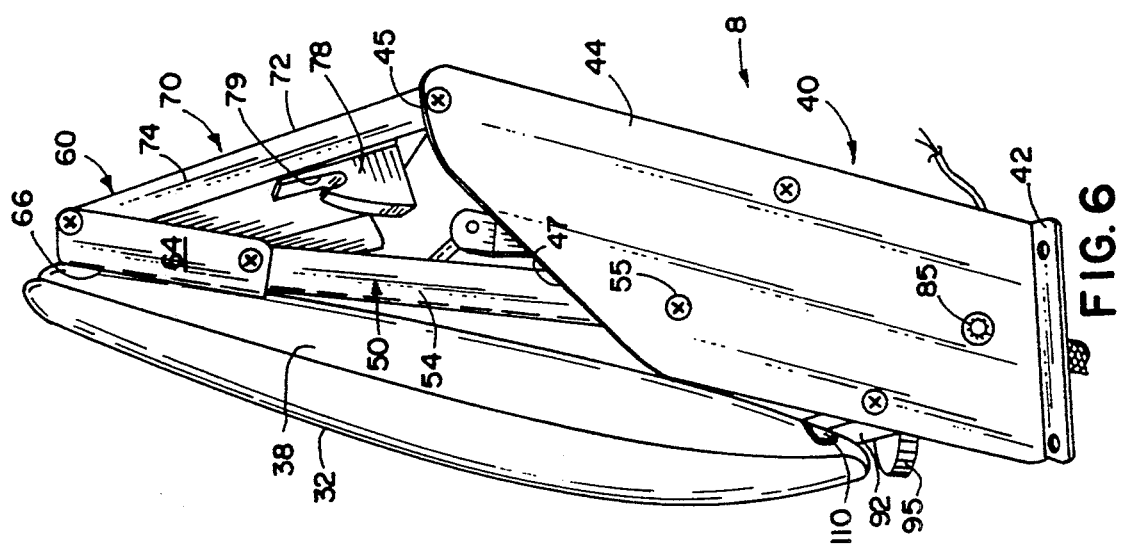
FIG. 6 is a left side elevational view of the armrest of the present invention shown removed from the vehicle and shown in a stored position.

The control mechanism for the armrest body 30 includes a base assembly 40 which, as best seen in FIGS. 6, 8, and 9, includes a base plate 42 with a pair of vertically, upwardly extending sides 44 and 46 which extend in generally parallel spaced relationship and are integrally formed with the 42. The sides 44 and 46 each terminate at an upward end 45 with a downwardly inclined forward edge 47 in relation to the position of the armrest when mounted in the vehicle. The base 40 is secured to the vehicle floor by means of conventional fastening bolts which extend through apertures 43 (FIG. 9) in base plate 42.

Figure 7:
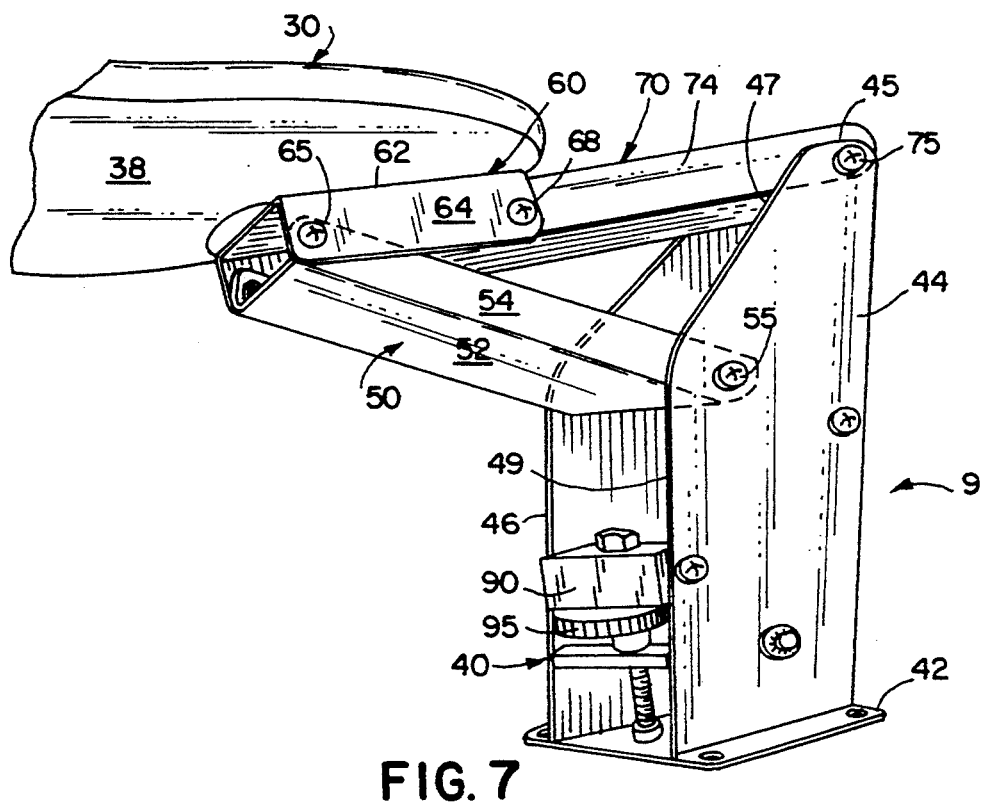
FIG. 7 is a fragmentary left perspective view of the armrest shown in FIG. 6 shown in an extended use position.

As best seen in FIG. 7, pivotally mounted to the forward edges 49 of the base assembly 40 is lower support arm 50 which includes a central plate 52 and sides 54 and 56 formed in the shape of a channel. The end of lower support arm 50 adjacent base assembly 40 is pivotally mounted between the legs 44 and 46 of the assembly by means of a pivot pin 55 extending through leg 44 and side 54 of arm 50 and a similar pivot connection on the opposite side extending through legs 46 and side 56. The opposite end of lower arm 50 terminates in a pivot connection with a support platform 60, which also is channel shaped, including leg 64, a top surface 62, and an opposite leg 66. The pivot connection of arm 50 with platform 60 is achieved by means of a pivot pin 65 extending through side 64 and side 54 and a similar pivot pin on the opposite side. The armrest body 30 is pivotally secured to the top 62 of platform 60 by means of a hollow externally threaded pivot member 65' (FIG. 11) which extends through plate 62 and is secured thereto by a nut in a conventional manner. Member 65' extends upwardly into a lower support housing 38 of the armrest body 30 which includes a suitable conventional mounting structure for the pivot member 65' to allow the armrest to swivel from side to side as shown by arrow B in FIG. 5. The armrest body 30 includes an upholstered, upper surface 32 which is mounted to the housing 38 in a conventional manner.

The rearwardly projecting end of platform 60 is pivotally coupled to an upper support arm 70 by means of pivot pins 68. Each pin 68 extends through a side wall 74 or 76 of the generally channel-shaped arm 70 which has a top surface 72. Thus pin 68 seen in FIG. 6, extends through side 64 of platform 60 and side 74 of the forward end of upper support arm 70. A similar pivot connection is provided on the opposite side. The rearwardly extending end of the tipper support arm 70 is pivotally mounted to the top of base assembly 40 by pivot pin 75 extending through leg 44 of the base and side 74 of the upper arm 70. A similar pivot connection is provided between base leg 46 and the opposite side 76 of the channel-shaped arm 70.

Figure 5:
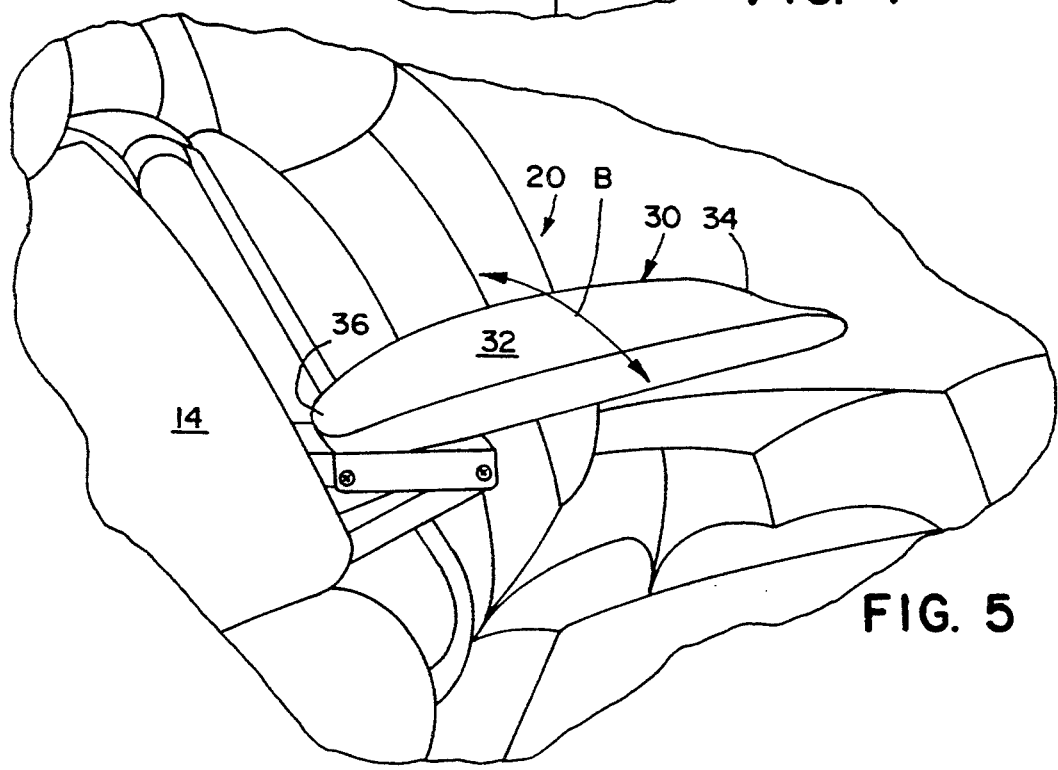
FIG. 5 is a fragmentary perspective view of a vehicle showing the armrest of FIGS. 1-4 shown in a side adjusted position.

Thus, the base and arms 50 and 70 together with platform 64 form a parallelogram-type support for movement of the armrest from a stored position shown in FIG. 6 to an extended use position as shown in FIG. 7 while the pivot connection 65 allows the swiveling of the armrest to a desired, side-to-side orientation. The armrest is releasably latched in the raised position as shown in FIGS. 4, 5, and 7 by latching mechanism which is best seen in FIGS. 8, 9, and 10 and which is now described.

The latching mechanism for the armrest includes a L-shaped latch 78 centrally located and extending downwardly from the top 72 of upper arm 70 as best seen in FIGS. 6 and. 9 and which includes a forwardly facing opening notch 79 for receiving a cross bar 89 of the latching assembly 80 (FIGS. 8 and 9). The cross bar 89 of latching assembly 80 is coupled between the ends of inwardly converging arms 84 and 86 extending upwardly from a horizontally extending U-shaped base 82. The lower ends of arms 84 and 86 are pivotally coupled to the rearward sides of the U-shaped base member 82 by means of pivot pins 81 and 83. The U-shaped member 82 includes a cross member 82' and forwardly extending legs 81' and 83'. The center of legs 81' and 83' are pivotally coupled between the base legs 44 and 46 by a pivot pin 85 for pivotally mounting member 82 with respect to the armrest base 40. Thus, the rear of member 82 and therefore arms 84 and 86 move upwardly and downwardly in a direction indicated by arrow D in FIG. 9. The upward and downward movement of the cross member 82' causes legs 84 and 86 which are coupled to upper support arm 70 to raise and lower also in a direction indicated by arrow D causing the upper arm to pivot either upwardly about pivot connection 75 or downwardly which in turn pivots the plane of surface 62 of platform 60 and therefore, armrest body 30 thereon in a direction indicated by arrow C in FIG. 4. This movement thus effects the tilting adjustment of the armrest in a generally vertical plane.

The cross member 89 of the latching assembly 80 is held within the notch 79 of latch 78 by means of a spring 87 (FIG. 9) which has an end coupled to the trailing edge of wall 46 of base 40 and an opposite end coupled to leg 86 for urging the latching cross member 89 (FIG. 8) into seating engagement with notch 79 of latch 78. This positive engagement of the vertically adjustable arms 84 and 86 to the armrest body 30 transmits the adjustment motion to the armrest when in a raised latched position for use. In order to provide the adjustment for such tilting of the armrest, the base member 82 of the latching assembly 80 is adjusted by the control mechanism 90 now described in connection with FIGS. 7 and 10.

The adjustment mechanism for the latching assembly 80 includes a mounting block 92 pivotally mounted between legs 44 and 46 of base 40 by means of pivot pins 91 and 93 (FIG. 10) which pivotally mount the block 92 to the base assembly 40. Rotatably mounted and vertically extending through block 92 is a threaded screw jack rod 94 having an adjustment knob 95 fixedly attached thereto for rotation of the screw jack 94 having an end 96 abutting the base plate 42 of base assembly 40 by a suitable pad. The threaded screw jack 94 is threadably extended through a cross member 100 pivotally coupled between the ends of arms 81' and 83' such that rotation of the knurled, generally horizontally extending adjustment knob causes the ends of arms 81' and 83' to pivot about pivot rod 85 thereby raising or lowering the latching arms 84 and 86 for tilting the armrest as described above. The knurled knob 95 extends sufficiently forwardly of the base 40 as seen in FIG. 7 to allow the vehicle operator to reach downwardly under the armrest for manually adjusting the tilt angle of the armrest, typically only requiring one such adjustment for the driver of the vehicle.

Figure 11:
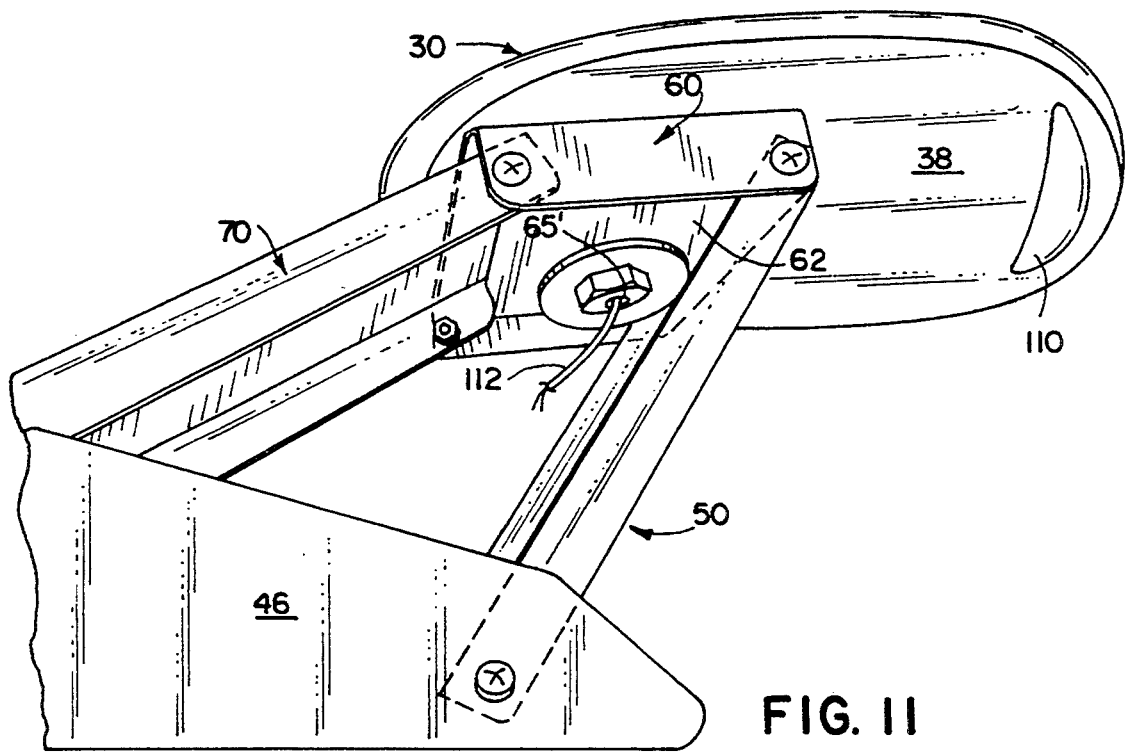
FIG. 11 is an enlarged fragmentary, lower perspective view of the swivel mechanism for adjustment of the armrest.

In order to store the armrest by moving it from the extended position shown in FIGS. 4 and 5 to the retracted position shown in FIG. 1, it is necessary to release the latching mechanism by pivoting arms 84 and 86 forwardly such that latch bar 89 disengages slot 79 of latch 78. This can be accomplished by an electrically operated solenoid which is coupled between the base 40 and either one of the latching arms 84 and 86 and which is controlled by a push-button switch 110 mounted to the forward end of the lower member 38 of armrest body 30. Switch 11.0 is coupled to the solenoid by means of electrical conductors 112 extending through the hollow pivot rod 65 as seen in FIG. 11. The solenoid provides an actuation force opposite that of spring 87 for releasing the latching mechanism from the latch member 78. For purposes of more clearly showing the latching assembly 80, the solenoid has not been depicted in the Figures, however, it can be a conventional, commercially available solenoid fixedly mounted to one of the inside surfaces of legs 44 or 46 and coupled to the correspondingly, closely adjacent legs 84 or 86 of the latching assembly 80.

Thus with the armrest assembly of the present invention, a fully adjustable armrest with ease of operation and adjustment is provided for the vehicle operator or passenger and allows the armrest to be ergonomically positioned for the most comfortable support of one's arm.

In some embodiments, the screw jack assembly 94 can be replaced with other adjustment structures such a rack and pinion gear arrangement and in some embodiments the adjustment knob 95 could be replaced with a motor drive for electrically adjusting the tilt angle of the armrest if desired. These and other modifications of the preferred embodiment of the invention described herein can be made by those skilled in the art without departing from the spirit or scope of the invention as defined by the appended claims.

The embodiments of the invention in which an exclusive property or privilege is claimed are defined as follows:

1. An armrest assembly comprising:
   a base for attachment to a vehicle;
   an elongated armrest body;
   arms pivotally coupling said armrest body to said base for allowing said armrest body to move from a stored position in a generally vertical plane to a generally horizontally extending use position; and
   a screw jack adjustment mechanism extending between said base and said armrest body said screw jack adjustment mechanism including a threaded member which can be rotated in a first direction or a second direction opposite said first direction for adjustably tilting said armrest body in a first direction when said threaded member is rotated in said first direction and in a second direction opposite said first direction when said threaded member is rotated in said second direction.

2. The armrest as defined in claim 1 and further including a latch means extending between said armrest body and said base for releasably holding said armrest body in said use position.

3. The armrest as defined in claim 2 wherein said screw jack adjustment mechanism is mounted to said base and is coupled to said latch means for tilting said armrest body.

4. The armrest as defined in claim 1 wherein said armrest body includes a concave support surface for cradling an arm therein.

5. The armrest as defined in claim 4 wherein said means for pivotally coupling said armrest body to said arms and a pivot pin extending through a platform defining one of said arms and into rotational engagement with said armrest body.

6. The armrest as defined in claim 1 and further including means for pivoting said arms for adjusting the tilt angle of said armrest body.

7. An armrest assembly comprising:
   a base for attachment to a vehicle;
   an elongated armrest body;
   arms pivotally coupling said armrest body to said base for allowing said armrest body to move from a stored position in a generally vertical plane to a generally horizontally extending use position;
   means for pivotally coupling said armrest body to said arms to allow said armrest body to swivel from side-to-side with respect to said base;
   latch means extending between said armrest body and said base for releasably holding said armrest body in said use position, wherein said latch means includes a latch coupled to said armrest body and including a slot therein, at least one latch arm, and pivot means for pivotally coupling said latch arm to said base, said latch arm including a latch bar movable into and out of said slot for releasably holding said armrest in said use position; and
   tilt adjustment means extending between said base and said latch means for tilting said armrest body.

8. The armrest as defined in claim 7 wherein said means for pivotally coupling said latch arm includes a tilt member pivotally coupled at one end to said latch arm and pivotally coupled to said base at a position spaced from said latch arm.

9. The armrest as defined in claim 8 wherein said tilt adjustment means includes said tilt member and means extending between said base and said tilt member for pivoting said tilt member with respect to said base for raising and lowering said latch arm to pivot said first named arms for adjusting the tilt angle of said armrest body.

10. An armrest assembly comprising:
    an elongated armrest body for supporting a person's arm;
    a base for attachment to a vehicle;
    a coupling assembly for coupling said armrest body to said base for allowing said armrest body to move from a stored position in a generally vertical plane to a generally horizontally extending use position by moving the forward end of the armrest upwardly away from said base, said coupling assembly including means for swiveling said armrest body with respect to said base; and
    a screw jack adjustment mechanism extending between said base and said armrest body, said screw jack adjustment mechanism including a threaded member which can be rotated in a first direction or a second direction opposite said first direction for adjustably tilting said armrest body in a first direction when said threaded member is rotated in said first direction and in a second direction opposite said first direction when said threaded member is rotated in said second direction.

11. The armrest as defined in claim 10 and further including releasable latching means coupled between said armrest body and said base for latching said armrest body in a use position.

12. The armrest as defined in claim 11 wherein said screw jack adjustment mechanism is coupled to said latching means for adjustably tilting said armrest body in a generally vertical plane when in a latched use position.

13. The armrest as defined in claim 12 wherein said coupling assembly comprises upper and lower support arms having first ends pivotally mounted to said base in vertically spaced relationship and opposite ends pivotally coupled in spaced relationship to said armrest body.

14. An armrest assembly comprising:
an elongated armrest body for supporting a person's arm;
a base for attachment to a vehicle, wherein said base includes a generally horizontally extending plate with a pair of spaced parallel upwardly extending legs;
a coupling assembly for coupling said armrest body to said base for allowing said armrest body to move from a stored position in a generally vertical plane to a generally horizontally extending use position by moving the forward end of the armrest upwardly away from said base, said coupling assembly including means for swiveling said armrest body with respect to said base from side-to-side, wherein said coupling assembly comprises upper and lower support arms having first ends pivotally mounted to said base in vertically spaced relationship and opposite ends pivotally coupled in spaced relationship to said armrest body; and
releasable latching means coupled between said armrest body and said base for latching said armrest body in a use position, wherein said latching means includes means for adjustably tilting said armrest body in a generally vertical plane when in a latched use position.

15. The armrest as defined in claim 14 wherein said upper and lower support arms are pivotally mounted in spaced relationship to said upwardly extending legs of said base and said opposite ends of said arms are pivotally mounted to a support platform to which said armrest body is pivotally mounted by means of a generally vertically extending pivot axle for swiveling the armrest body when in an extended use position, 16. The armrest as defined in claim 15 wherein said means for adjustably tilting said armrest body comprises means for vertically moving said latching assembly to pivot said armrest body by the movement of said upper and lower support arms.

17. The armrest as defined in claim 16 wherein said adjustment means comprises a screw ,jack member vertically fixedly mounted to said base and threadably mounted to said latching means such that movement of said screw jack member causes said latching means to raise and lower thereby tilting said armrest body.

18. The armrest as defined in claim 17 wherein said armrest body includes a concave upper support surface.

19. An armrest assembly comprising:
a base for attachment to a vehicle;
an elongated armrest body having a concave arm supporting surface;
arms pivotally coupling said armrest body to said base for allowing said armrest body to move from a stored position in a generally vertical plane to a generally horizontally extending use position;
means for pivotally coupling said armrest body to said arms to allow said armrest body to swivel from side-to-side with respect to said base; and
a screw jack adjustment mechanism extending between said base and said armrest body, said screw jack adjustment mechanism including a threaded member which can be rotated in a first direction or a second direction opposite said first direction for adjustably tilting said armrest body in a first direction when said threaded member is rotated in said first direction and in a second direction opposite said first direction when said threaded member is rotated in said second direction.

20. The armrest as defined in claim 19 wherein said adjustment mechanism includes latch means for releasably holding said armrest body in said use position.

* * * * *